(12) United States Patent
Stoll et al.

(10) Patent No.: US 8,235,728 B2
(45) Date of Patent: Aug. 7, 2012

(54) APPARATUS FOR PRACTICING OPHTHALMOLOGIC SURGICAL TECHNIQUES

(76) Inventors: Stuart Stoll, W. Hollywood, CA (US); Alexander Hatsis, Rockville Centre, NY (US); Carlos Montoya, Jr., Huntington Park, CA (US)

( * ) Notice: Subject to any disclaimer, the term of this patent is extended or adjusted under 35 U.S.C. 154(b) by 1504 days.

(21) Appl. No.: 11/273,378

(22) Filed: Nov. 13, 2005

(65) Prior Publication Data
US 2006/0105309 A1  May 18, 2006

Related U.S. Application Data

(60) Provisional application No. 60/627,779, filed on Nov. 13, 2004.

(51) Int. Cl.
*G09B 23/28* (2006.01)
(52) U.S. Cl. .......... 434/271; 434/262; 434/270
(58) Field of Classification Search .......... 434/262, 434/270, 271; 606/4, 5
See application file for complete search history.

(56) References Cited

U.S. PATENT DOCUMENTS

| | | | |
|---|---|---|---|
| 1,042,815 A | 10/1912 | Myers | |
| 1,582,199 A | 4/1926 | Walters | |
| 1,630,944 A | 5/1927 | Ingersoll | |
| 2,019,516 A | 11/1935 | Weinberg | |
| 2,324,702 A | 7/1943 | Hoffmann | |
| 3,177,593 A | 4/1965 | Loeb | |
| 3,210,884 A | 10/1965 | Sharff | |
| 3,789,518 A | 2/1974 | Chase | |
| 3,905,130 A | 9/1975 | Gordon | |
| 4,136,466 A | 1/1979 | Wrue | |
| 4,253,199 A | 3/1981 | Banko | |
| 4,494,936 A | 1/1985 | Stickles | |
| 4,596,528 A | 6/1986 | Lewis | |
| 4,637,159 A * | 1/1987 | Kulis | 43/42.32 |
| 4,674,503 A | 6/1987 | Peyman | |
| 4,737,132 A | 4/1988 | Shunsaku | |
| 4,761,150 A | 8/1988 | Lautenberger | |
| 4,762,495 A * | 8/1988 | Maloney et al. | 434/271 |
| 4,762,496 A | 8/1988 | Maloney | |
| 4,865,551 A | 9/1989 | Maloney | |
| 4,865,552 A | 9/1989 | Maloney | |
| 5,080,111 A | 1/1992 | Pallin | |
| 5,137,459 A | 8/1992 | Zirm | |
| 5,261,822 A | 11/1993 | Hall | |
| 5,336,236 A | 8/1994 | Nevyas-Wallace | |
| 5,380,207 A * | 1/1995 | Siepser | 434/271 |
| 5,423,840 A | 6/1995 | Casebeer | |
| 5,425,644 A | 6/1995 | Szinicz | |
| 5,571,124 A | 11/1996 | Zelman | |
| 5,766,016 A | 6/1998 | Sinclair | |
| 5,785,531 A | 7/1998 | Leung | |

(Continued)

OTHER PUBLICATIONS

Basic and Clinical Science Course, 1997-98, "Lens and Cataract—Section 11." Chapter VIII, Figure VIII-8, p. 90, American Academy of Ophthalmology, San Francisco, CA.

(Continued)

*Primary Examiner* — Xuan Thai
*Assistant Examiner* — Bruk Gebremichael
(74) *Attorney, Agent, or Firm* — Law Office of David Hong

(57) ABSTRACT

An apparatus for teaching and practicing an ophthalmologic surgical technique of creating the continuous curvilinear capsulorhexis comprises a flexible and removable cellophane-type cover, which is wrapped substantially around a putty-like malleable body to mimic the human anterior lens capsule and lens anatomy.

9 Claims, 4 Drawing Sheets

U.S. PATENT DOCUMENTS

| | | | |
|---|---|---|---|
| 5,868,580 | A | 2/1999 | Amrein |
| 5,893,719 | A * | 4/1999 | Radow .......................... 434/271 |
| 6,589,057 | B1 | 7/2003 | Keenan |
| 2005/0125059 | A1 | 6/2005 | Pinchuk |

OTHER PUBLICATIONS

See link to Video for Akura; Printout from Internet: http://ascrs2009.conferencefilms.com/acover.wcs?entryid=100110 on Aug. 5, 2009 (1 page).

Printout from Internet: www.google.com for search for "kitaro drylab"; Aug. 5, 2009 (2 pages).

Akura, Junsuke; printout from Internet: http://www.egms.de/de/meetings/doc2009/09doc068.shtml (2 pages); published Jul. 9, 2009.

Akura, printout from Internet: http://www.apacrs.org/09FF.html (1 page); unknown publ. date.

Kitaro Drylab and Akura, 1 page adveriesment in Japanese.

Bellis, Mary; "Silly Putty," http//:inventors.about.com/library/inventors/blsillyputty.htm, Nov. 13, 2004, 3 pages.

Webster, R., et. al., "A Haptic Surgical Simulator for the Continuous Curvilinear Capsulorhexis Procedure During Cataract Surgery." Annual Medicine Meets Virtual Reality Conf. (MMVR 2004). Newport Beach, CA, Jan. 14-17, 2004; 4 pages.

http://www.wa-eyemd.org/cataract_surgery-video-clips.htm; "Cataract Surgery." Internet pages printed on Nov. 13, 2004; 3 pages.

http://www.sillyputty.com/history_101/history101.htm; "Silly Putty History 101." Internet pages printed out on Nov. 13, 2004; 2 pages.

http://www.jirehdesign.com/illustrations/surgical/cataract/01.htm; "Eye illustrations, opthalmic and opthamology artwork." Internet pages printed out on Nov. 13, 2004; 2 pages.

Osborn, S.; "Let's Play with Clay." Internet printout 3 pages on Nov. 13, 2004 from http://familycrafts.about.com/cs/clay/a/playclay.htm.

http://www.medcompare.com/itemdetails.asp?itemid=10638 printout of 2 pages for "Irrigating Cystitomes," on Nov. 13, 2004.

http://www.veripack.com printout of "Polyprophylene Film—Colors," 1 page on Nov. 13, 2004.

http://www.goodfellow.com printout of "polypropylene," of 2 pages on Nov. 13, 2004.

http://www.papermart.com printout of "polypropylene rolls" of 2 pages on Nov. 13, 2004.

http://www.jaedworks.com/clayspot/polyclay-faq/basics.html printout of "Polymer Clay FAQ," of 3 pages on Nov. 13, 2004.

http://www.wpinc.com printout of "Capusulorhexis Forceps," of 2 pages on Nov. 13, 2004.

http://www.scpscience.com printout of "XRF Cells and Thin Film," of 2 pages on Nov. 13, 2004.

* cited by examiner

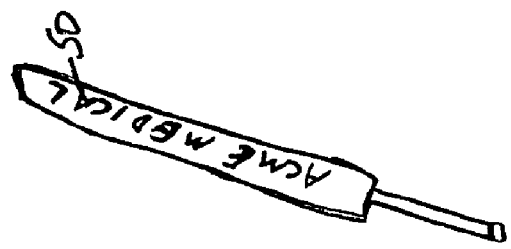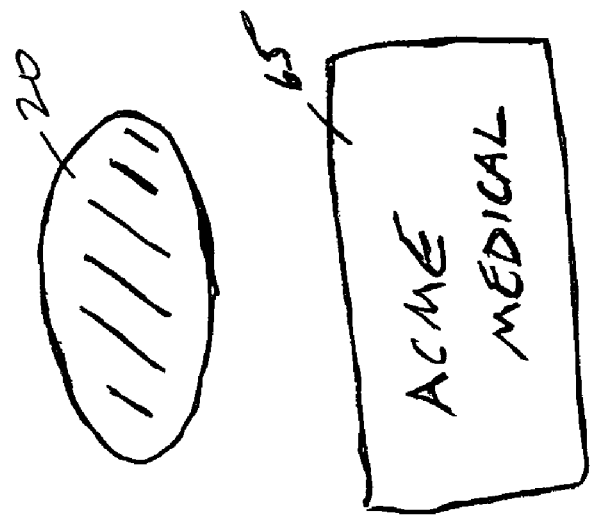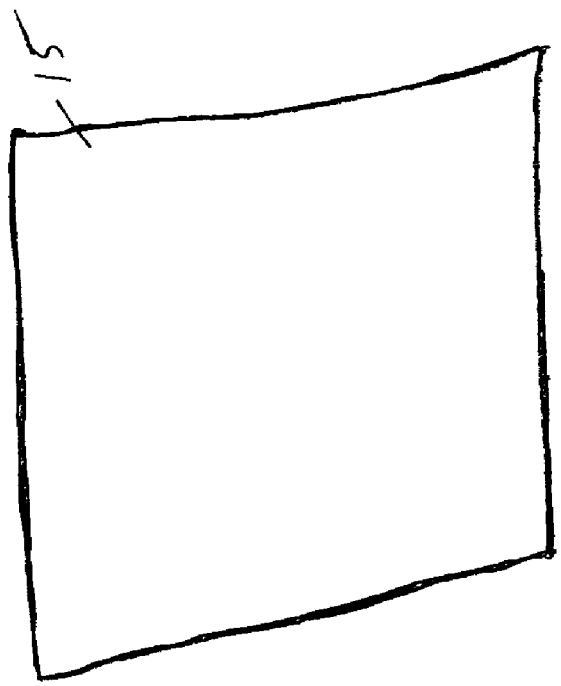
FIG. 5

APPARATUS FOR PRACTICING OPHTHALMOLOGIC SURGICAL TECHNIQUES

This application claims the benefit of U.S. Provisional Application No. 60/627,779, filed Nov. 13, 2004.

BACKGROUND OF THE INVENTION

1. Field of the Invention

This invention relates to a model and simulator for practicing ophthalmologic surgical techniques, including cataract surgery, and an apparatus for simulating the human eye structure, namely the human anterior lens capsule, to practice certain ophthalmologic surgery techniques.

2. Description of Related Art

Cataract surgery has evolved over the years as a result of contributions from many notable physicians as well as technological advances, which have led to the elegant procedure which is now commonly referred to as phacoemulsification or quite simply "phaco". Like a carefully choreographed dance within the eye, the many intricate steps to replace the crystalline lens must happen in a precise and orderly fashion. Each step in the process, while important in its own function, is vital for the success of the subsequent maneuvers and as such assumes a greater role towards the completion of an uncomplicated procedure. A complication during the early steps of surgery can lead the surgeon to stray off course, and a cascade of events may follow which could ultimately result in a sub-optimal result.

Microsurgery in the form of phacoemulsification has a very steep learning curve which requires hands-on training. It is not possible to learn and become proficient with the techniques from reading text, watching film or even observing in the operating room. A true appreciation for the complexity of the techniques and their potential complications can only be gained through actual surgical experience. To a degree, models simulating anatomy and surgical procedures have also proved quite valuable. Various teaching tools have been developed most notably using pig eyes for practice in a laboratory setting. While these models do provide valuable experience, there are difficulties associated with procurement and disposal of the eyes. In addition, a cadaveric pig eye does not resemble the in-vivo human anatomy as closely as many would like. This is especially true in regards to the anterior lens capsule where ophthalmology residents often attempt their first capsulotomy procedure.

Arguably one of the most difficult steps of phacoemulsification to master is the creation of the continuous curvilinear capsulorhexis or "CCC" as pioneered by Howard Gimbel, MD, MPH, FRCSC. In this continuous curvilinear capsulorhexis surgical technique, the surgeon creates a small incision with a cystotome (a bent needle type surgical tool) in the center of the anterior lens capsule to form a flap. Grasping this flap of tissue, the surgeon makes a tear in a circular or curvilinear fashion.

However, this is a difficult procedure to master, and if the surgeon does not reposition and re-grasp the flap of tissue appropriately and continue to tear in the desired circular fashion, there runs the risk of creating an unwanted radial or downhill tear.

In addition, during surgery, there is the possibility of wound distortion and loss of viscoelastic material, which would in turn cause the surgical area to change from a relatively flat surface to a rounded configuration. This rounded configuration can further increase the possibility of developing an unwanted radial tear of the anterior lens capsule during this procedure.

Occurring prior to the use of the phacoemulsification probe within the eye, the successful creation of a "CCC" is vital to the safety of the procedure and the long-term stability of the lens implant within the eye. This invention presents a new teaching tool to help ophthalmology residents understand and practice the technique of creating a continuous curvilinear capsulorhexis. The inventors and eye surgeons (specifically Dr. Alexander Hatsis, Dr. Carlos Montoya, Jr. and Dr. Stuart Stoll) have collaborated to create this surgical teaching tool, which has now been endorsed by Dr. Howard Gimbel. This invaluable surgical teaching and practicing tool is easily accessible, portable, lightweight, and accurately mimics the physical feel and touch of human eye anatomy. While it seems that Dr. Charles Kelman, M.D. the father of modern-day cataract surgery, was right when he said that not every ophthalmologist is qualified to perform phacoemulsification, this teaching aid should help in part to flatten the learning curve and provide realistic hands-on experience.

From the preceding descriptions, it is apparent that the devices currently being used have significant disadvantages. Thus, important aspects of the technology used in the field of invention remain amenable to useful refinement.

SUMMARY OF THE INVENTION

The purpose of the invention is to provide a simple but elegant device to mimic, to simulate and to copy a portion of the human eye for training ophthalmologic surgeons with the proper feel and touch of the crystalline lens surface for the difficult continuous curvilinear capsulorhexis ("CCC") step in phacoemulsification.

Another purpose of this device is to provide a practice training surface for surgeons.

Another purpose of this device is to replace practicing on cadaver pig eyes in a laboratory setting.

Another purpose of this invention is to provide a simple, portable, and lightweight device that any surgical resident or practitioner could employ outside of the laboratory setting.

Another purpose of this invention is to provide an inexpensive and simple device on which to practice difficult eye surgical techniques.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 5 is view of the most basic elements of the kit for the invention.

PARTS LIST

10 Apparatus for Practicing Eye Surgery.
15 Cover/Membrane/Tissue (simulates crystalline lens capsule).
20 Body—clay, putty, polymer (simulates human lens).
25 Surface of Cover.
30 First Surface of Cover (outer).
35 Second Surface of Cover (inner).
40 Surface of Body.
45 Flat Working Surface of apparatus.
50 Surgical Tool—forceps or capsulorhexis device.
55 Hand of User.
60 Initial Cut on Cover to mimic "CCC" procedure.
65 Case for surgical apparatus.

DESCRIPTION OF THE PREFERRED EMBODIMENTS

Figure 1:
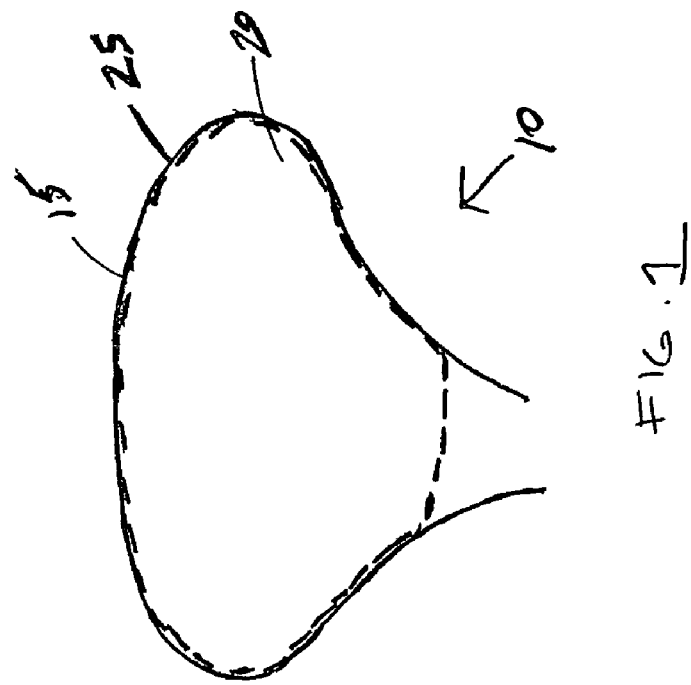
FIG. 1 is a partial view of the apparatus.
Figure 2:
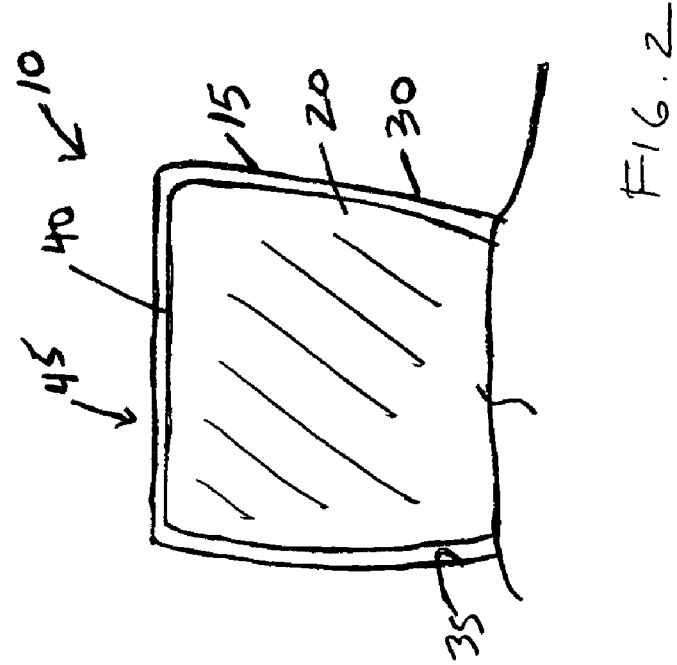
FIG. 2 is a cross-sectional view of the apparatus.
Figure 3:
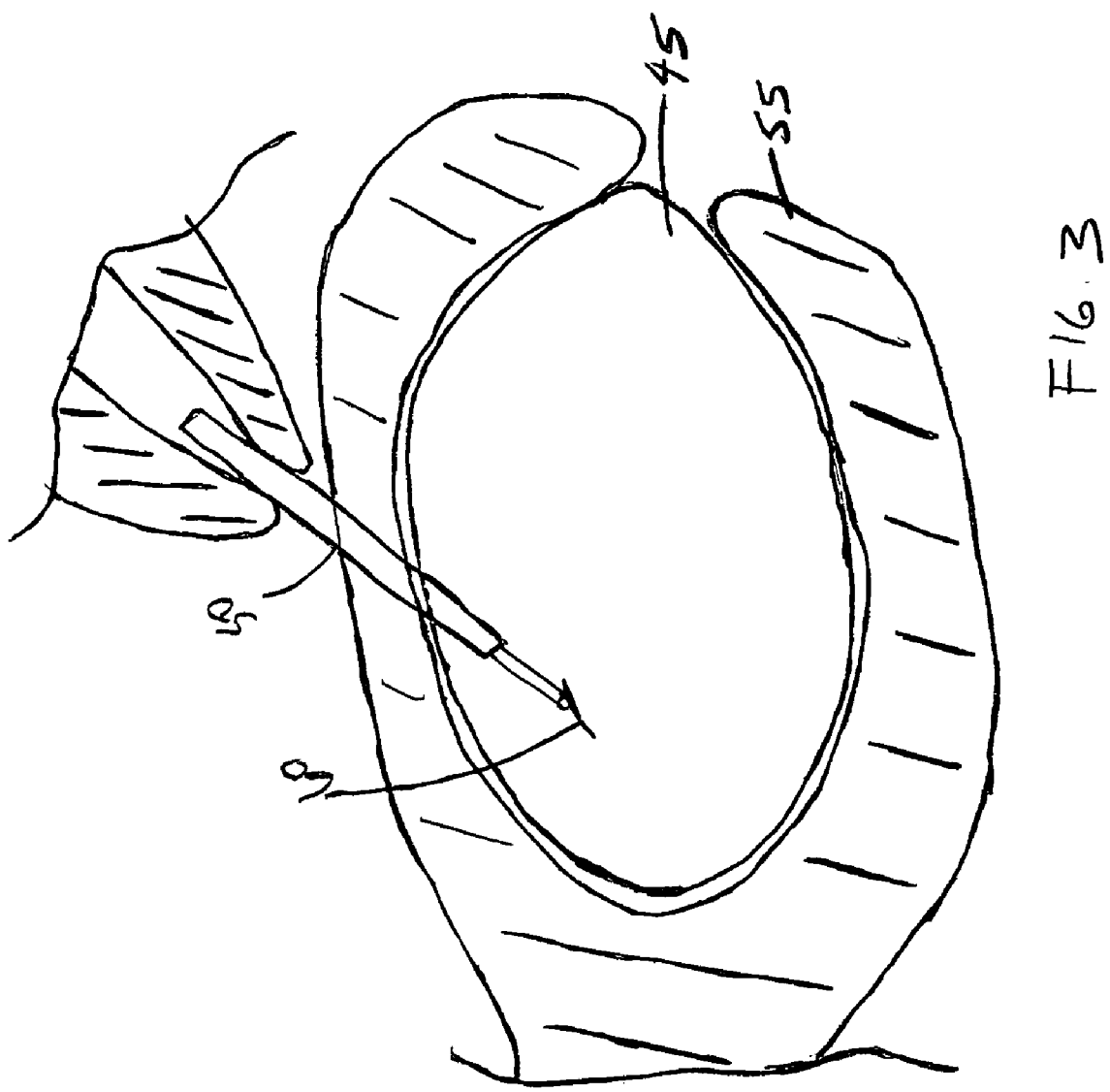
FIG. 3 is a view of the apparatus being used to practice the one step of the eye surgery technique.
Figure 4:
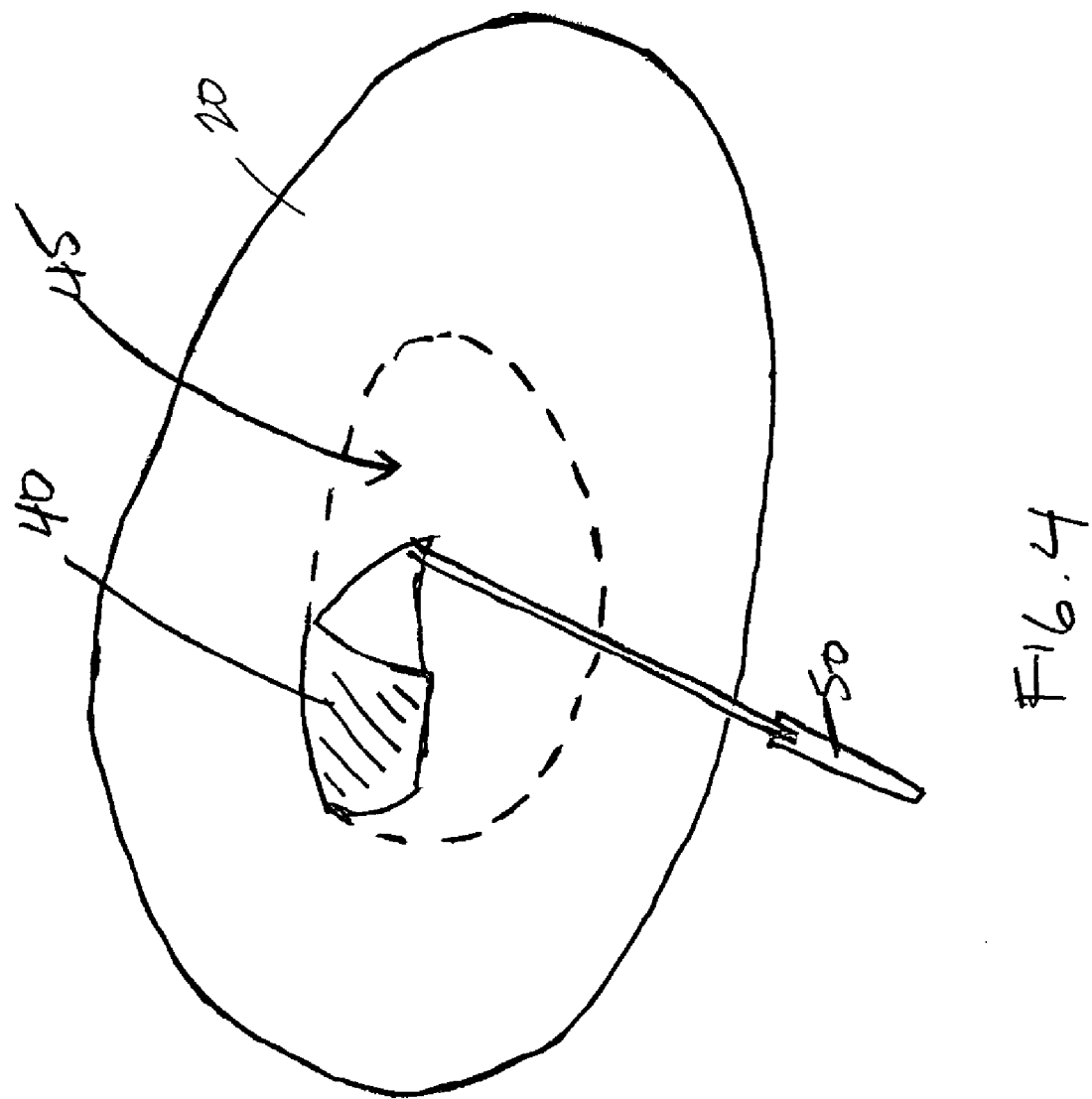
FIG. 4 is a view of the apparatus being used to practice another step of the eye surgery technique.

Referring to FIGS. 1-4, there is illustrated an apparatus 10 for practicing surgical techniques for the eye. This apparatus 10 is comprised of a cover 15, which is substantially wrapped around a body 20, to provide a surgical training surface to mimic the human anterior lens capsule for surgical techniques, including but not limited to the continuous curvilinear capsulorhexis ("CCC") procedure, common to modern cataract surgery.

Cover (15)

The cover 15 is wrapped tightly around the body 20 to accurately mimic the physical feel and touch of the human eye anatomy, namely the anterior lens capsule over the lens.

This cover has at least one surface 25 and may also have a first or outer surface 30 and a second or inner surface 35. The cover should be able to mimic the "physical feel and touch" of tearing the human anterior lens capsule in the "CCC" procedure. The cover can also be referred to as a membrane, sheath, tissue, or working surface.

This cover can be comprised of many cellophane-type materials, including but not limited to synthetic or natural materials, cellophane, polypropylene film, mylar, cellulose, paper, or other similar materials. The thickness of this cover can vary and will depend on the particular material. This cellophane-like paper, material and cover should have tearing properties similar to the anterior capsule of the human lens.

In addition, this cover can be cellophane-like, flexible, and readily removable from the malleable body, which helps this cover to be easily removed, repositioned, and engaged with the malleable body allowing for multiple practice sessions with one cover.

To further enhance the simulation of human eye anatomy, the cover can be of a different color than the body. For example, the cover could be clear and the body can be yellow colored or other contrasting color combinations to highlight the differences to the user.

Body (20)

The cover 15 is substantially wrapped around the body 20, which substantially mimics the physical feel and touch of the human lens and eye anatomy below the anterior capsule of the lens. The cover 15 can be tightly or tautly wrapped around the body 20. This body 20 can be comprised of a variety of different materials, including but not limited to putty, clay, modeling polymer, and Silly Putty® brand toy. The body 20 should be comprised of material that is malleable and easy to work with the hands, but the body 20 should also provide enough resistance to mimic the human eye anatomy so that the user or surgeon may have an adequate model to practice surgical techniques. In addition, this malleable body can also be non-water-sensitive.

The body has a body surface 40, which is exposed when the user cuts the cover 15 with a surgical implement or tool such as a cystotome and cystotome needle, capsulorhexis forceps or other fine-point grasping implement.

Using the Invention:

The user will roll the body of putty or clay into a ball and place the cover substantially and tightly around the body and tie up the loose ends of the cover. Preferably holding the apparatus 10 in the non-dominant hand of the user, the user will press down on the apparatus 10 to create a relatively flat or working surface 45 of the cover and the body to mimic the human anterior lens capsule and lens (after injecting viscoelastic into the anterior chamber).

Once this flat or relatively flat working surface 45 is created, the user can practice surgical techniques, including but not limited to the continuous curvilinear capsulorhexis ("CCC") procedure.

This invention provides excellent feedback and sensory data to the user because when the user provides additional squeezing force and pressure around the apparatus with the holding or non-dominant hand, this pressure can compel the body to transfer this energy to the cover or exude body material from a user's cut 60 on the cover. This type of feedback is extremely useful for surgeons in learning the fine touch required for a successful continuous curvilinear capsulorhexis procedure.

The elements required to simulate the "CCC" are all readily available to any ophthalmologist or surgical resident and include the following: a cystotome needle, 3 cc syringe or comparable instrument to attach and manipulate the cystotome, capsulorhexis forceps or other comparable fine-point grasping implement, malleable clay-like material, including but not limited to Silly Putty® brand toy, putty, polymer, modeling putty or clay, and cellophane-like paper, including but not limited to cellophane, polypropylene, and mylar. This cellophane-like paper or cover should have tearing properties similar to the anterior capsule of the human lens.

Method & Technique for Surgical Teaching Tool:

1. Form a small amount of the body (Silly Putty®/clay/modeling polymer) into a ball of manageable size for a user's hand or approximately 25 mm in diameter.
2. Drape or wrap the cover (cellophane-like paper, etc.), which is cut to approximately 15 cm×15 cm or another easily manageable size) over the body or ball of putty and twist the loose ends of the cover together. The body of putty should be centered in the cover to begin. This cover can be placed tightly or tautly around the body.
3. Preferably hold the apparatus (cover wrapped around the body) 10 in the non-dominant hand of the user between the base of the thumb and the base of the index finger with the loose ends of the cover twisted together and held out of the way in the palm of the hand.
4. Further, preferably using the dominant hand, press firmly on the top of the cover-body complex or apparatus 10 to flatten out the curvature and to provide a smooth working and surgical surface. This surface will now be similar to and mimic the physical feel and touch of the human anterior lens capsule (when the human anterior lens capsule becomes flattened with the introduction of viscoelastic into the anterior chamber prior to the creation of the capsulorhexis).
5. Further, preferably, with the dominant hand, utilize the desired surgical device, including but not limited to a cystotome, which is attached to the syringe or other handle, to puncture the cover 10 centrally and to initiate a curvilinear tear in the cover 10. See FIGS. 3 and 4.

6. The tear of the cover 10 can be completed in part or in full with the cystotome surgical device. Alternatively, a capsulorhexis forceps or other grasping implement or surgical tool can be used to help complete the curvilinear tear.
7. Use the non-dominant hand to provide additional upward force to the cover-body apparatus and complex. These forces will cause the putty or body material to assume a more rounded configuration and will simulate the loss of viscoelastic material from the human eye as may occur from wound distortion. The result will be to cause the capsulotomy to tear in a radial fashion thereby demonstrating the weakness of an anterior radial tear and the importance of maintaining a flat working surface.

Further, this invention presents instant feedback to the user in mimicking human eye anatomy during this difficult surgical procedure. During surgery, a viscoelastic material is added to the anterior chamber to help maintain a working space and to help flatten the anterior surface of the crystalline lens. However, this viscoelastic material can escape from the eye with wound distortion and allow the lens to become rounded, which increases the chances of creating an unwanted radial tear of the anterior lens capsule. By mimicking these features of the anatomy and typical problems, the user can practice and gain valuable experience in both optimal and sub-optimal situations.

In addition, this instant invention also mimics one of the powerful features of the continuous curvilinear capsulorhexis technique, namely, maintaining the integrity of the lens capsule and preventing unwanted radial tears or ruptures of the lens capsule, even when great stress is placed on the surgical area during the "phaco" procedure. During a "phaco" procedure, a surgeon's actions of manipulating the lens within the capsular bag, rotating and spinning the lens, and disintegrating a cataract can place great stress upon the lens capsule.

Similarly, this invention allows for a realistic simulation of the forces upon the lens capsule during "phaco" and also the strength of this "CCC" surgical technique. Upon completion of a continuous curvilinear capsulorhexis, the user can squeeze the apparatus body to apply great stress and cause the putty body to squeeze through the capsulotomy without creating a radial tear or "rupturing the capsule." This particular feature demonstrates the tremendous strength and advantage of this continuous curvilinear capsulorhexis surgical technique in a simple and elegant invention.

The cover can easily be removed and reapplied to the putty in a new area to practice the techniques again. These materials may be reused many times without additional expense. The cover will eventually have to be replaced after enough tears have been created such that intact paper cannot be placed completely over the surface of the putty.

In order to master the "CCC" technique, the user must practice, practice, and practice this technique, and this instant invention allows for the user to practice this difficult surgical technique in basically any environment or situation and with very little cost or expense.

Once the user has thoroughly practiced the "CCC" technique with this invention, the user will be able to proceed to the operating room with greater skill and confidence.

This simple but elegant invention can accurately mimic the conditions of the complex human eye for particular surgical procedures, including but not limited to continuous curvilinear capsulorhexis; this invention can be reused many times; this invention demonstrates the advantages of the continuous curvilinear capsulorhexis surgical technique and the weakness of the anterior radial tear.

Portable Training Kit

As shown in FIG. 5, there is a portable and lightweight surgical training kit, which comprises a cover, a body (putty, clay, etc.), a surgical tool, and a case. In addition, marketing or brand logos or marks can be placed on the tools, cover, or case to provide a method of advertising for interested companies and manufacturers of surgical devices and products.

This invention also presents a wonderful and easy method for a company to advertise to prospective customers and users in the medical field by labeling its marks on the training kit for this invention.

Alternative Embodiment:

As stated above, one preferred application of this invention is to provide a suitable apparatus to practice techniques for cataract surgery, namely the continuous curvilinear capsulorhexis. In addition, users could practice other surgical techniques with this invention.

Additionally, this invention could also be integrated with other known eye surgery modeling devices to create new and improved modeling devices. For example, if a current modeling device allows for corneal incisions, then the current invention could be integrated so that after the corneal incision is completed, then the user can practice continuous curvilinear capsulorhexis and other cataract surgical methods.

A surgical practicing and teaching apparatus comprising: a flexible cover wrapped substantially and tautly around a malleable body, which is putty-like and non-water-sensitive, to create a relatively flat surgical practice surface; the malleable body being able to be easily manipulated into different shapes; the malleable body being able to provide adequate resistance to a surgical tool and to mimic the physical characteristics of a human lens capsule; and whereby said surgical practice surface substantially mimics human anterior lens capsule and lens structures for practicing surgical techniques.

The malleable body material comprises clay, putty or polymer. The flexible cover comprises a synthetic material or a natural material. The flexible cover comprises polypropylene, cellophane, mylar, paper, cellulose, or thin film. The apparatus further comprises a surgical tool. The surgical tool comprises a cystotome, a capsulorhexis forceps or other comparable fine-point grasping implement.

An apparatus for practicing an ophthalmologic surgical technique of creating a continuous curvilinear capsulorhexis comprising: a readily removable and flexible cellophane-type cover and a malleable and non-water-sensitive body, which comprises a putty-like material; the cellophane-type cover is wrapped substantially and tautly around the malleable body to create a relatively flat surgical practice surface; the malleable body can be easily manipulated into different shapes by a user's hand, is able to provide adequate resistance to a surgical tool and to mimic physical characteristics of a human lens, and is able to be squeezed by the user's hand and to transfer energy from the squeezing of the user's hand throughout the malleable body to the surgical surface to further mimic the physical characteristics of the human lens capsule during surgery, whereby the surgical practice surface substantially mimics human anterior lens capsule and lens structures for practicing the surgical technique of creating the continuous curvilinear capsulorhexis.

A method for practicing creating a continuous curvilinear capsulorhexis using at least one ophthalmologic surgical tool and an apparatus, which comprises a readily removable and flexible cellophane-type cover and a malleable non-water-sensitive and putty-like body; the cellophane-type cover is wrapped substantially and tautly around the malleable body to create a relatively flat surgical practice surface; the malleable body can be easily manipulated into different shapes by a user's hand, is able to provide adequate resistance to a surgical tool and to mimic physical characteristics of a human lens, and is able to be squeezed by the user's hand and to transfer energy from the squeezing of the user's hand throughout the malleable body to the surgical surface to further mimic the physical characteristics of the human lens capsule during surgery, comprising the following steps:

a. Forming the malleable body into the shape of a ball, said malleable body being of manageable size for a user's hand;

b. Wrapping the cellophane-type cover substantially over the malleable body whereby the malleable body is substantially centered within the cover;

c. Securing loose ends of the cover together such that said cover is relatively tight around the malleable body;

d. Holding said apparatus in a user's non-dominant hand between the base of the thumb and the base of the index finger with the loose ends of the cover twisted together and held out of the way in the palm of the user's non-dominant hand;

e. Using the user's dominant hand, pressing firmly on the top of the apparatus to flatten out the cellophane-type cover over the malleable body and to provide the smooth surgical practice surface, said surface being relatively similar to the physical feel and touch of a human anterior lens capsule, when the human anterior lens capsule becomes flattened with the introduction of a viscoelastic material into the anterior chamber prior to the creation of the capsulorhexis;

f. Using the surgical device to puncture the cover centrally and to initiate a curvilinear tear in the cover;

g. Using the surgical device to complete the curvilinear tear in the cover; and h. Using the user's non-dominant hand to provide an upward force to the cover and body to cause the malleable body to assume a more rounded configuration and to simulate loss of the viscoelastic material from a human eye as may occur from wound distortion.

A kit for an apparatus for practicing ophthalmologic surgical technique of creating a continuous curvilinear capsulorhexis comprising: a casing for the kit; at least one easily removable and flexible cellophane-type cover; a malleable, putty-type, and non-water-sensitive body; the at least one cellophane-type cover is enabled to be wrapped substantially and tautly around the malleable body to create a relatively flat surgical practice surface; the malleable body can be easily manipulated into different shapes by a user's hand, is able to provide adequate resistance to a surgical tool and to mimic physical characteristics of a human lens, and is able to be squeezed by the user's hand and to transfer energy from the squeezing of the user's hand throughout the malleable body to the surgical surface to further mimic the physical characteristics of the human lens capsule during surgery; and at least one surgical tool for creating the continuous curvilinear capsulorhexis.

The above description describes one or more preferred embodiments, but it will be understood that it is not intended to limit the invention to those embodiments. On the contrary, it is intended to cover all alternatives, modifications, and equivalents as may be included within the spirit and scope of the invention.

The invention claimed is:

1. An apparatus for practicing an ophthalmologic surgical technique of creating a continuous curvilinear capsulorhexis comprising:

a flexible cellophane-type cover;
a malleable body, which comprises a putty or clay material;
said cover has a different color relative to said malleable body and comprises a first surface and a second surface;
said cover further comprises a tearing property similar to anterior capsule of a human lens;
the cellophane-type cover is wrapped substantially and tautly around the malleable body to create a relatively flat surgical practice surface, and said cover is readily removable from said malleable body for easy replacement;
wherein, the malleable body is easily manipulated into different shapes by a user's hand, is able to provide adequate resistance to a surgical tool, is able to mimic physical characteristics of a human lens, and is able to be squeezed by the user's hand and transfer energy from the squeezing of the user's hand throughout the malleable body to the relatively flat surgical practice surface to further mimic the physical characteristics of the human lens capsule during surgery;
wherein the relatively flat surgical practice surface is a smooth surgical practice surface relatively similar to the physical feel and touch of human anterior lens capsule, mimicking the human anterior lens capsule when flattened with the introduction of a viscoelastic material into the anterior chamber prior to the creation of the capsulorhexis;
wherein application of an upward force, by the user's hand, to the cover and malleable body causes the malleable body to form a rounded configuration to simulate loss of viscoelastic material from a human eye due to wound distortion;
whereby the smooth surgical practice surface substantially mimics human anterior lens capsule and lens structures for practicing the surgical technique of creating the continuous curvilinear capsulorhexis.

2. The apparatus of claim 1 wherein the flexible cover comprises polypropylene, cellophane, mylar, paper, cellulose, or thin film.

3. The apparatus of claim 1 further comprises a surgical tool.

4. The apparatus of claim 3 wherein the surgical tool comprises a cystotome, a capsulorhexis forceps, or a fine-point grasping implement.

5. A method for practicing creating a continuous curvilinear capsulorhexis using at least one ophthalmologic surgical tool and an apparatus, which comprises:

a readily removable and flexible cellophane-type cover and a malleable body, which comprises a putty or clay material; the cellophane-type cover is wrapped substantially and tautly around the malleable body to create a relatively flat surgical practice surface;
the malleable body is easily manipulated into different shapes by a user's hand, is able to provide adequate resistance to a surgical tool, is able to mimic physical characteristics of a human lens, and is able to be squeezed by the user's hand and transfer energy from the squeezing of the user's hand throughout the malleable body to the relatively flat surgical practice surface to further mimic the physical characteristics of the human lens capsule during surgery; said method comprises the following steps:

a. Forming the malleable body into the shape of a ball, said malleable body being of manageable size for a user's hand;

b. Wrapping the cellophane-type cover substantially over the malleable body whereby the malleable body is substantially centered within the cover;

c. Securing loose ends of the cover together such that said cover is relatively tight around the malleable body;

d. Holding said apparatus in a user's non-dominant hand between the base of the thumb and the base of the index finger with the loose ends of the cover twisted together and held out of the way in the palm of the user's non-dominant hand;

e. Using the user's dominant hand, pressing firmly on the top of the apparatus to flatten out the cellophane-type cover over the malleable body and to provide a smooth surgical practice surface, said smooth surgical practice surface being relatively similar to the physical feel and touch of a human anterior lens capsule, mimicking the human anterior lens capsule when flattened with the introduction of a viscoelastic material into the anterior chamber prior to the creation of the capsulorhexis;

f. Using the surgical device to puncture the cover centrally and to initiate a curvilinear tear in the cover;

g. Using the surgical device to complete the curvilinear tear in the cover; and h. Using the user's non-dominant hand to provide an upward force to the cover and body to cause the malleable body to assume a more rounded configuration to simulate loss of viscoelastic material from a human eye occurring from wound distortion.

6. A kit for an apparatus for practicing ophthalmologic surgical technique of creating a continuous curvilinear capsulorhexis comprising:

a casing for the kit;

at least one flexible cellophane-type cover;

a malleable body, which comprises a putty or clay material;

said cover has a different color relative to said malleable body and comprises a first surface and a second surface;

said cover further comprises a tearing property similar to anterior capsule of a human lens;

the at least one cellophane-type cover is enabled to be wrapped substantially and tautly around the malleable body to create a relatively flat surgical practice surface; and said cover is easily removable from said malleable body for easy replacement;

wherein, the malleable body is easily manipulated into different shapes by a user's hand, is able to provide adequate resistance to a surgical tool, is able to mimic physical characteristics of a human lens, and is able to be squeezed by the user's hand and transfer energy from the squeezing of the user's hand throughout the malleable body to the relatively flat surgical practice surface to further mimic the physical characteristics of the human lens capsule during surgery;

wherein the relatively flat surgical practice surface is a smooth surgical practice surface relatively similar to the physical feel and touch of human anterior lens capsule, mimicking the human anterior lens capsule when flattened with the introduction of a viscoelastic material into the anterior chamber prior to the creation of the capsulorhexis; and at least one surgical tool for creating the continuous curvilinear capsulorhexis;

wherein application of an upward force, by the user's hand, to the cover and malleable body causes the malleable body to form a rounded configuration to simulate loss of viscoelastic material from a human eye due to wound distortion.

7. The kit of claim 6 wherein the at least one flexible cover comprises polypropylene, cellophane, mylar, paper, cellulose, or thin film.

8. The kit of claim 6 wherein the at least one surgical tool comprises a cystotome, a capsulorhexis forceps or a fine grasping tool.

9. The apparatus of claim 1 wherein the malleable body comprises a modeling polymer.

* * * * *